(12) United States Patent
Sekiguchi et al.

(10) Patent No.: US 10,618,400 B2
(45) Date of Patent: Apr. 14, 2020

(54) HYBRID VEHICLE

(71) Applicant: TOYOTA JIDOSHA KABUSHIKI KAISHA, Toyota-shi (JP)

(72) Inventors: Tadashi Sekiguchi, Ashigarakami-gun (JP); Yoshio Itou, Susono (JP); Tomoaki Yanagida, Susono (JP); Tomoe Osada, Gotenba (JP); Hironori Asaoka, Numazu (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 63 days.

(21) Appl. No.: 15/869,234

(22) Filed: Jan. 12, 2018

(65) Prior Publication Data

US 2018/0201118 A1 Jul. 19, 2018

(30) Foreign Application Priority Data

Jan. 17, 2017 (JP) ................. 2017-005835

(51) Int. Cl.
*B60K 6/48* (2007.10)
*B60K 6/365* (2007.10)
(Continued)

(52) U.S. Cl.
CPC ............. *B60K 6/48* (2013.01); *B60K 6/26* (2013.01); *B60K 6/365* (2013.01); *B60K 6/38* (2013.01);
(Continued)

(58) Field of Classification Search
CPC ... B60K 6/26; B60K 6/38; B60K 6/48; B60K 6/365; B60K 6/405; B60K 6/543; B60K 11/02; B60K 2001/006; B60K 2006/4825; B60K 2006/264; F16H 57/0476; F16H 45/02; F16H 57/0457; F16H 57/0483;
(Continued)

(56) References Cited

U.S. PATENT DOCUMENTS 5,285,111 A 2/1994 Sherman
5,856,709 A * 1/1999 Ibaraki .................. B60W 20/10
290/45

(Continued)

FOREIGN PATENT DOCUMENTS

CN 101245843 A 8/2008
CN 104395120 A 3/2015
(Continued)

*Primary Examiner* — Leslie A Nicholson, III
(74) *Attorney, Agent, or Firm* — Oblon, McClelland, Maier & Neustadt, L.L.P.

(57) ABSTRACT

A hybrid vehicle includes: an engine including an output shaft configured to output a power; a damper placed on a first axis that is the same axis as the output shaft; a rotating machine placed on the first axis; a torque converter placed on the first axis; a transmission mechanism placed so that an input shaft of the transmission mechanism is positioned on a second axis that is an axis different from the first axis; a case in which the rotating machine and the transmission mechanism are accommodated; driving wheels attached to drive shafts; and an oil accumulated in a lower part of a space surrounded by the case and used for lubrication of the transmission mechanism, the oil being in contact with a part of the rotating machine.

6 Claims, 10 Drawing Sheets

(51) Int. Cl.
  *B60K 6/38*    (2007.10)
  *B60K 6/405*   (2007.10)
  *B60K 11/02*   (2006.01)
  *F16H 57/04*   (2010.01)
  *B60K 6/26*    (2007.10)
  *B60K 6/543*       (2007.10)
  *B60K 1/00*        (2006.01)
  *F16H 45/02*       (2006.01)

(52) U.S. Cl.
  CPC ............ *B60K 6/405* (2013.01); *B60K 11/02* (2013.01); *F16H 57/0476* (2013.01); *B60K 6/543* (2013.01); *B60K 2001/006* (2013.01); *B60K 2006/262* (2013.01); *B60K 2006/264* (2013.01); *B60K 2006/4825* (2013.01); *B60Y 2200/92* (2013.01); *B60Y 2304/01* (2013.01); *F16H 45/02* (2013.01); *F16H 57/0457* (2013.01); *F16H 57/0483* (2013.01); *F16H 57/0484* (2013.01); *F16H 57/0489* (2013.01); *F16H 2045/0221* (2013.01); *Y10S 903/904* (2013.01)

(58) Field of Classification Search
  CPC ............ F16H 57/0484; F16H 57/0489; F16H 2045/0021; B60Y 2200/92; B60Y 2304/01; Y10S 903/904
  USPC ............................................ 475/5, 149, 151
  See application file for complete search history.

(56) References Cited

U.S. PATENT DOCUMENTS

| | | | |
|---|---|---|---|
| 6,306,057 B1 * | 10/2001 | Morisawa | B60K 6/365 475/5 |
| 6,524,217 B1 * | 2/2003 | Murakami | B60K 6/365 180/65.225 |
| 6,585,066 B1 | 7/2003 | Koneda et al. | |
| 6,863,140 B2 * | 3/2005 | Noreikat | B60K 6/40 180/65.23 |
| 8,974,339 B2 * | 3/2015 | Ideshio | F16H 41/24 192/3.21 |
| 10,166,974 B2 * | 1/2019 | Kumazaki | B60W 10/06 |
| 2001/0013701 A1 | 8/2001 | Onoyama et al. | |
| 2001/0016165 A1 * | 8/2001 | Shimabukuro | B60K 6/365 417/2 |
| 2002/0115516 A1 | 8/2002 | Kawabata et al. | |
| 2004/0154846 A1 | 8/2004 | Kira | |
| 2007/0163823 A1 * | 7/2007 | Abe | B60K 6/26 180/65.23 |
| 2008/0194381 A1 | 8/2008 | Maddock | |
| 2009/0114462 A1 | 5/2009 | Tahara et al. | |
| 2009/0227408 A1 * | 9/2009 | Imamura | B60K 6/445 475/5 |
| 2015/0031488 A1 * | 1/2015 | Okuda | B60K 6/365 475/5 |
| 2015/0251531 A1 * | 9/2015 | Hotta | B60L 50/51 180/65.25 |
| 2015/0258885 A1 | 9/2015 | Ideshio et al. | |
| 2016/0052379 A1 * | 2/2016 | Inoue | B60L 3/0023 74/661 |

FOREIGN PATENT DOCUMENTS

| | | |
|---|---|---|
| JP | 5-33855 | 2/1993 |
| JP | 10-339185 | 12/1998 |
| JP | 2002-103998 A | 4/2002 |
| JP | 2005-059788 A | 3/2005 |
| JP | 2007-261302 A | 10/2007 |
| JP | 2012-171371 A | 9/2012 |
| JP | 2012-247042 A | 12/2012 |
| JP | 2013-193613 A | 9/2013 |
| JP | 2014-184923 A | 10/2014 |

* cited by examiner

AXIAL DIRECTION

RADIAL DIRECTION

RADIAL DIRECTION

RADIAL DIRECTION

HYBRID VEHICLE

INCORPORATION BY REFERENCE

The disclosure of Japanese Patent Application No. 2017-005835 filed on Jan. 17, 2017 including the specification, drawings and abstract is incorporated herein by reference in its entirety.

BACKGROUND

1. Technical Field

The present disclosure relates to a hybrid vehicle.

2. Description of Related Art

Japanese Patent Application Publication No. 10-339185 (JP 10-339185 A) discloses a front-engine front-wheel drive (FF) hybrid vehicle including an engine, a rotating machine, a transaxle, drive shafts, driving wheels, and the like. A damper, a torque converter, a transmission mechanism, a differential, and the like are provided in a case of the transaxle, and the damper and the torque converter are placed on the same axis as an output shaft of the engine. Further, the transmission mechanism is placed such that the output shaft of the engine and an input shaft of the transmission mechanism are placed on the same axis, but the output shaft of the engine and an output shaft of the transmission mechanism are placed on different axes. The rotating machine is placed outside the case of the transaxle on an axis different from the output shaft of the engine, and is configured such that a power output from the output shaft of the engine and a power output from an output shaft of the rotating machine are transmittable to the driving wheels.

SUMMARY

The hybrid vehicle described in JP 10-339185 A separately requires an exclusive cooling device configured to cool the rotating machine that generates heat by operating, which causes a problem to cause upsizing of the hybrid vehicle correspondingly.

The present disclosure provides a hybrid vehicle that can achieve downsizing and cool a rotating machine.

As an exemplary aspect of the present disclosure is a hybrid vehicle. The hybrid vehicle includes: an engine including an output shaft configured to output a power; a damper placed on a first axis that is the same axis as the output shaft; a rotating machine placed on the first axis; a torque converter placed on the first axis; a transmission mechanism placed so that an input shaft of the transmission mechanism is positioned on a second axis that is an axis different from the first axis; a case in which the rotating machine and the transmission mechanism are accommodated; drive shafts; driving wheels attached to the drive shafts; and an oil accumulated in a lower part of a space surrounded by the case and used for lubrication of the transmission mechanism, the oil being in contact with a part of the rotating machine.

Further, in the above disclosure, the torque converter may include a lock-up clutch, and the damper, the rotating machine, and the torque converter may be placed in this order from an engine side so that a power of the engine is transmitted to the damper, the rotating machine, and the torque converter in this order.

As such, in the hybrid vehicle of the present disclosure, the rotating machine is placed on the engine side relative to the torque converter. Accordingly, even if such a defect occurs that the torque converter cannot be locked up by the lock-up clutch, the engine can be started by a power of the rotating machine.

Further, in the above disclosure, the hybrid vehicle may further include a differential connected to the drive shafts and accommodated in the case. The differential may include a differential ring gear and the differential ring gear may be placed in the case such that a part of the rotating machine and a part of the differential ring gear overlap with each other when viewed from an axial direction of the first axis and the differential ring gear partially are in contacted with the oil.

Hereby, in the hybrid vehicle of the present disclosure, a distance between the rotating machine and the differential ring gear can be made closer in a radial direction of the differential ring gear, so that an oil scooped up by the differential ring gear can be easily poured over the rotating machine, thereby making it possible to improve coolability of the rotating machine.

Further, in the above disclosure, the hybrid vehicle may further include a differential connected to the drive shafts and accommodated in the case. The differential may include a differential ring gear, and the rotating machine and the differential ring gear may be placed in the case such that the rotating machine is positioned on an extension line of the differential ring gear in a radial direction and the differential ring gear partially contacts with the oil.

Hereby, in the hybrid vehicle of the present disclosure, the oil scooped up by the differential ring gear is easily poured over the rotating machine, thereby making it possible to improve coolability of the rotating machine.

Further, in the above disclosure, the hybrid vehicle may further include a clutch configured to interrupt a power transmission between the engine and the rotating machine. The clutch may be provided in an inside-diameter side of a rotor included in the rotating machine.

As such, in the hybrid vehicle of the present disclosure, the clutch is placed on the inside-diameter side of the rotor included in the rotating machine, thereby making it possible to shorten a length of the transaxle in the axial direction in comparison with a case where the rotating machine and the clutch are serially placed side by side in the axial direction of the output shaft of the engine.

Further, the hybrid vehicle may further include, in the above disclosure, a clutch configured to interrupt a power transmission between the engine and the rotating machine. The clutch may be provided in a first power transmission path between the engine and the rotating machine; and a second power transmission path between the rotating machine and the driving wheels may be connected when the clutch interrupts the first power transmission path.

As such, in the hybrid vehicle of the present disclosure, even if the clutch interrupts the power transmission between the engine and the rotating machine, the power transmission path between the rotating machine and the driving wheels is connected, so that an electric power can be generated by regeneration of the rotating machine by a rotational force from a driving-wheel side.

In the hybrid vehicle of the present disclosure, the rotating machine is accommodated in the same case as the damper, the torque converter, and the transmission mechanism, and a space where an oil accumulated in the case and the rotating machine can make contact with each other is formed in the case. Hereby, the oil and the rotating machine can make contact with each other in the space, so that the rotating machine can be cooled. Thus, it is not necessary to provide an exclusive cooling device for cooling the rotating machine, thereby making it possible to restrain upsizing of the hybrid vehicle correspondingly. This yields such an effect that downsizing is achieved and the rotating machine can be cooled.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes one embodiment of an FF (front-engine front-wheel drive) hybrid vehicle to which the present disclosure is applied, with reference to the drawings. Note that the present disclosure is not limited by the present embodiment, but can be also applied to a hybrid vehicle that employs a rear-engine rear-wheel drive (RR) system, for example.

Figure 1:
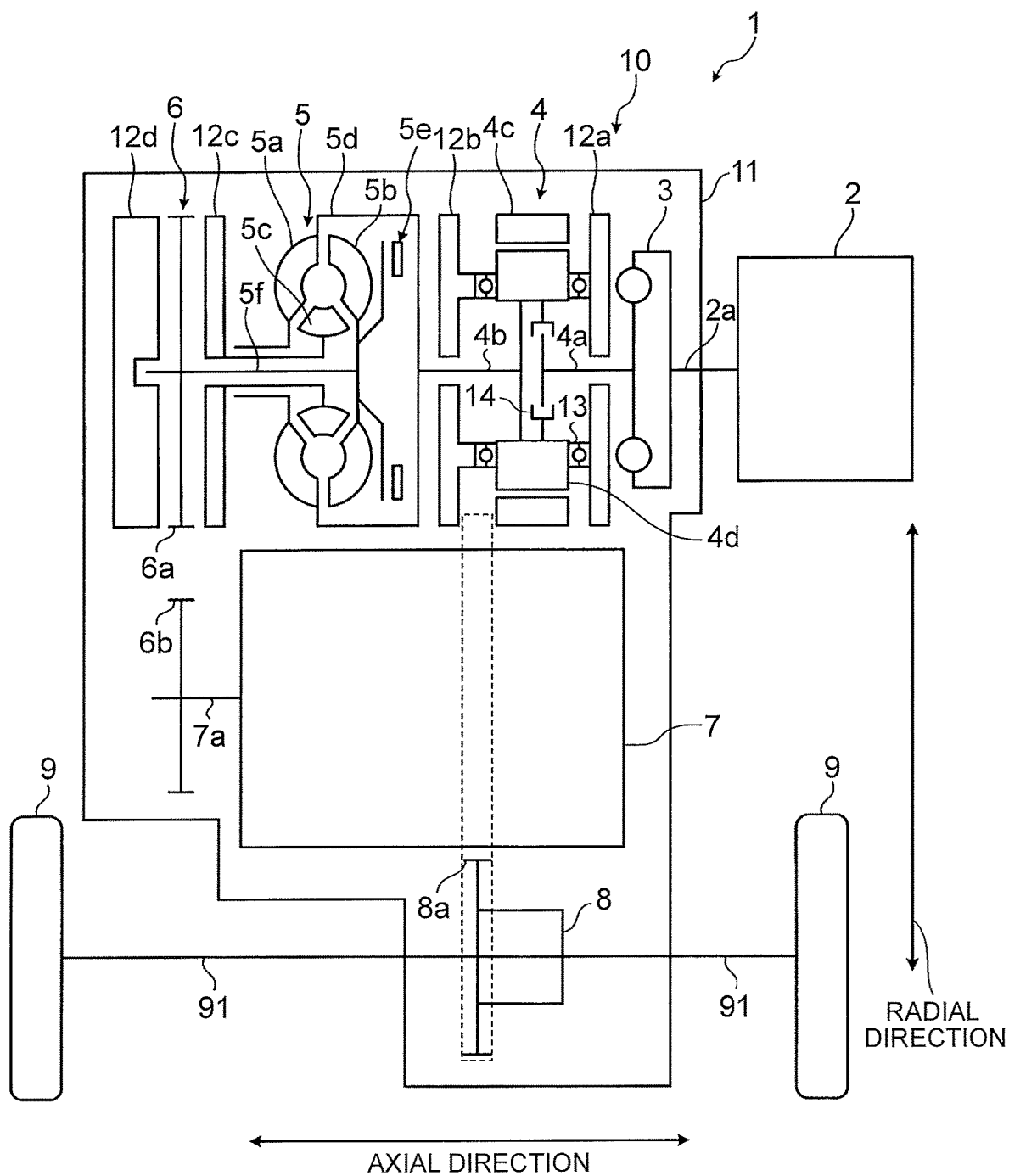
FIG. 1 is a skeleton diagram illustrating a hybrid vehicle according to an embodiment.

FIG. 1 is a skeleton diagram of a hybrid vehicle 1 according to the embodiment. As illustrated in FIG. 1, the hybrid vehicle 1 of the embodiment includes an engine 2, a transaxle 10, and a pair of driving wheels 9.

The transaxle 10 is configured such that a damper 3, a motor generator 4 as a rotating machine, a torque converter 5, a power transmission mechanism 6, a transmission mechanism 7, a differential 8, and the like are accommodated in a transaxle case 11, which is a housing of the transaxle 10. The transaxle 10 constitutes a power transmission device that transmits a driving torque input from the engine 2 to the pair of driving wheels 9.

An output shaft 2a, which is an output shaft of the engine 2, is connected to an input shaft 4a of the motor generator 4 via the damper 3. The damper 3 is configured to restrain and absorb torque fluctuations between the output shaft 2a and the input shaft 4a.

The motor generator 4 functions as an electric motor and a generator, and includes a stator 4c, and a rotor 4d which is a rotor rotatably provided on an inside-diameter side of the stator 4c. The input shaft 4a and an output shaft 4b of the motor generator 4 are placed on the same axis (first axis) as the output shaft 2a. A clutch 14 that can interrupt power transmission between the engine 2 and the motor generator 4 is placed on the inside-diameter side relative to the rotor 4d, and is connected to an axial end portion of the input shaft 4a on a side opposite to a side connected to the damper 3. Since the clutch 14 is placed on the inside-diameter side relative to the rotor 4d of the motor generator 4, it is possible to shorten a length of the transaxle 10 in an axial direction of the output shaft 2a in comparison with a case where the motor generator 4 and the clutch 14 are serially arranged side by side in the axial direction. Hereinafter, an "axial direction" in the present embodiment refers to an axial direction of the output shaft 2a unless a target shaft is specified. The rotor 4d of the motor generator 4 is provided in the transaxle case 11, and is supported, via bearings 13, by a pair of wall portions 12a, 12b opposed to each other via the motor generator 4.

The torque converter 5 is constituted by a pump impeller 5a, a turbine runner 5b, a stator 5c, a one-way clutch (not shown), a cover 5d, and a lock-up clutch 5e. The output shaft 4b of the motor generator 4 is connected to the pump impeller 5a via the cover 5d, and the pump impeller 5a transmits a torque to the turbine runner 5b via a working fluid. The stator 5c is configured to amplify the torque to be transmitted to the turbine runner 5b from the pump impeller 5a. The one-way clutch (not shown) restricts a rotation direction of the stator 5c to one direction. The turbine runner 5b is connected to an output shaft 5f of the torque converter 5. The lock-up clutch 5e can directly transmit a power to the output shaft 5f of the torque converter 5 from the cover 5d by engaging.

Further, the torque converter 5 is supported by the wall portion 12b that supports the rotor 4d of the motor generator 4 and a wall portion 12c opposed to the wall portion 12b in the axial direction via the torque converter 5. Since the wall portion 12b serves as supports for the rotor 4d of the motor generator 4 and for the torque converter 5 as such, the transaxle 10 can have a compact structure in the axial direction.

As illustrated in FIG. 1, in the hybrid vehicle 1 of the embodiment, the damper 3, the motor generator 4, and the torque converter 5 are placed on the same axis as the output shaft 2a of the engine 2 in order near the engine 2, so that the power of the engine 2 is transmitted to the damper 3, the motor generator 4, and the torque converter 5 in this order. Here, in a case where the torque converter 5 is placed on an engine-2 side relative to the motor generator 4 in the axial direction, the engine 2 is started by a power of the motor generator 4 in such a state where the torque converter 5 is locked up by the lock-up clutch 5e. Accordingly, when such a defect occurs that the torque converter 5 cannot be locked up by the lock-up clutch 5e, the engine 2 might not be able to be started by the power of the motor generator 4. In this regard, in a case where the motor generator 4 is provided on the engine-2 side relative to the torque converter 5 in the axial direction like the hybrid vehicle 1 of the embodiment, even if such a defect occurs that the torque converter 5 cannot be locked up by the lock-up clutch 5e, the engine 2 can be started by the power of the motor generator 4.

In the power transmission mechanism 6, a power transmission gear train is constituted by two gears, i.e., a first gear 6a provided in the output shaft 5f of the torque converter 5, and a second gear 6b provided in an input shaft 7a of the transmission mechanism 7. The power transmission mechanism 6 transmits a power from the output shaft 5f of the torque converter 5 to the input shaft 7a of the transmission mechanism 7 by decelerating the power at a predetermined speed reducing ratio via the first gear 6a and the second gear 6b.

Further, the first gear 6a is supported by the wall portion 12c that supports the torque converter 5 and a wall portion 12d opposed to the wall portion 12c via the first gear 6a in the axial direction. Since the wall portion 12c serves as supports for the torque converter 5 and for the first gear 6a of the power transmission mechanism 6 as such, the transaxle 10 can have a compact structure in the axial direction. Note that the first gear 6a may be supported by the transaxle case 11 instead of the wall portion 12d. Since an extra wall portion is not provided between the first gear 6a and the transaxle case 11 in the axial direction, the transaxle 10 can have a further compact structure in the axial direction.

Figure 2:
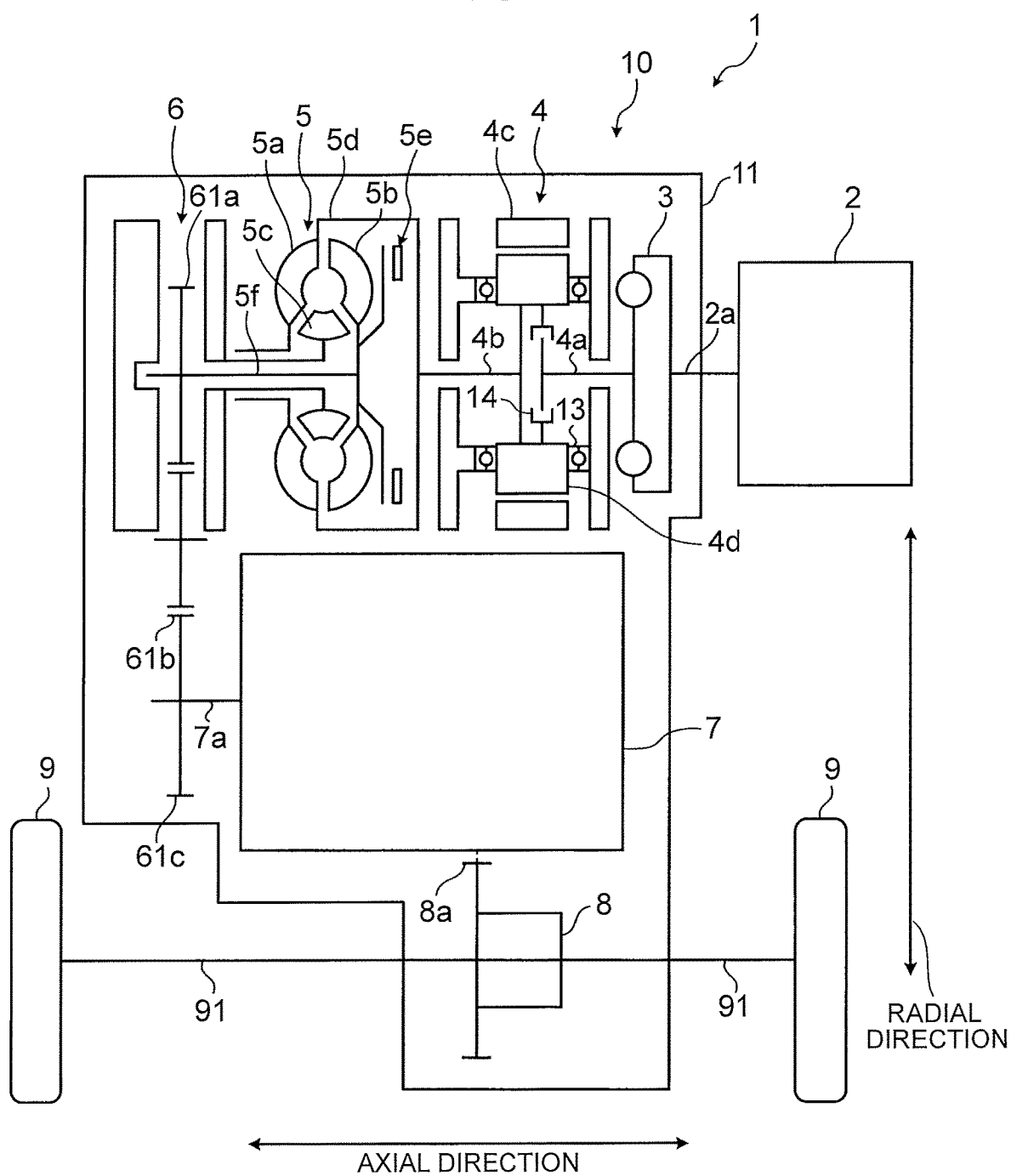
FIG. 2 is a skeleton diagram of a hybrid vehicle at the time of using a power transmission mechanism constituted by three gears.

FIG. 2 is a skeleton diagram of a hybrid vehicle 1 at the time of using a power transmission mechanism 6 constituted by three gears. In the power transmission mechanism 6 illustrated in FIG. 2, a power transmission gear train is constituted by three gears, i.e., a first gear 61a provided in an output shaft 5f of a torque converter 5, a third gear 61c provided in an input shaft 7a of a transmission mechanism 7, and a second gear 61b meshing with the first gear 61a and the third gear 61c. The power transmission mechanism 6 transmits a power from the output shaft 5f of the torque converter 5 to the input shaft 7a of the transmission mechanism 7 by decelerating the power at a predetermined speed reducing ratio via the first gear 61a, the second gear 61b, and the third gear 61c.

Figure 3:
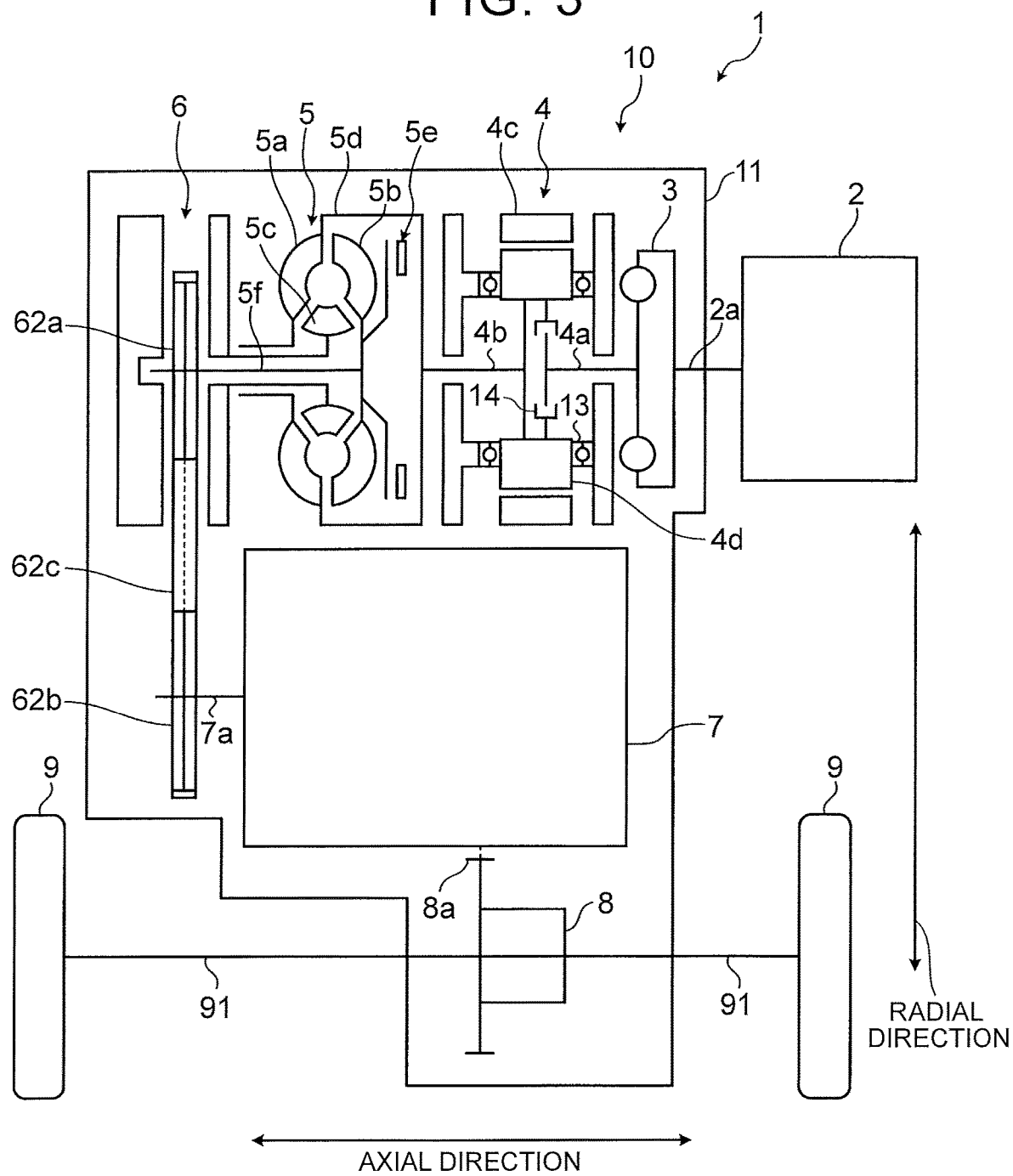
FIG. 3 is a skeleton diagram of a hybrid vehicle at the time of using a power transmission mechanism constituted by a pair of pulleys and a chain.

FIG. 3 is a skeleton diagram of a hybrid vehicle 1 at the time of using a power transmission mechanism 6 constituted by a pair of pulleys 62a, 62b and a chain 62c. The power transmission mechanism 6 illustrated in FIG. 3 is constituted by a first pulley 62a provided in an output shaft 5f of a torque converter 5, a second pulley 62b provided in an input shaft 7a of a transmission mechanism 7, and a chain 62c wound around the first pulley 62a and the second pulley 62b. The power transmission mechanism 6 transmits a power from the output shaft 5f of the torque converter 5 to the input shaft 7a of the transmission mechanism 7 at a constant speed (a transmission ratio=1) via the first pulley 62a, the chain 62c, and the second pulley 62b.

The transmission mechanism 7 is placed so that the input shaft 7a of the transmission mechanism 7 is positioned on an axis (second axis) different from an output shaft 2a of an engine 2. As the transmission mechanism 7, a mechanism including a planetary gear mechanism, a mechanism including a continuously variable transmission, and the like can be used.

Figure 4:
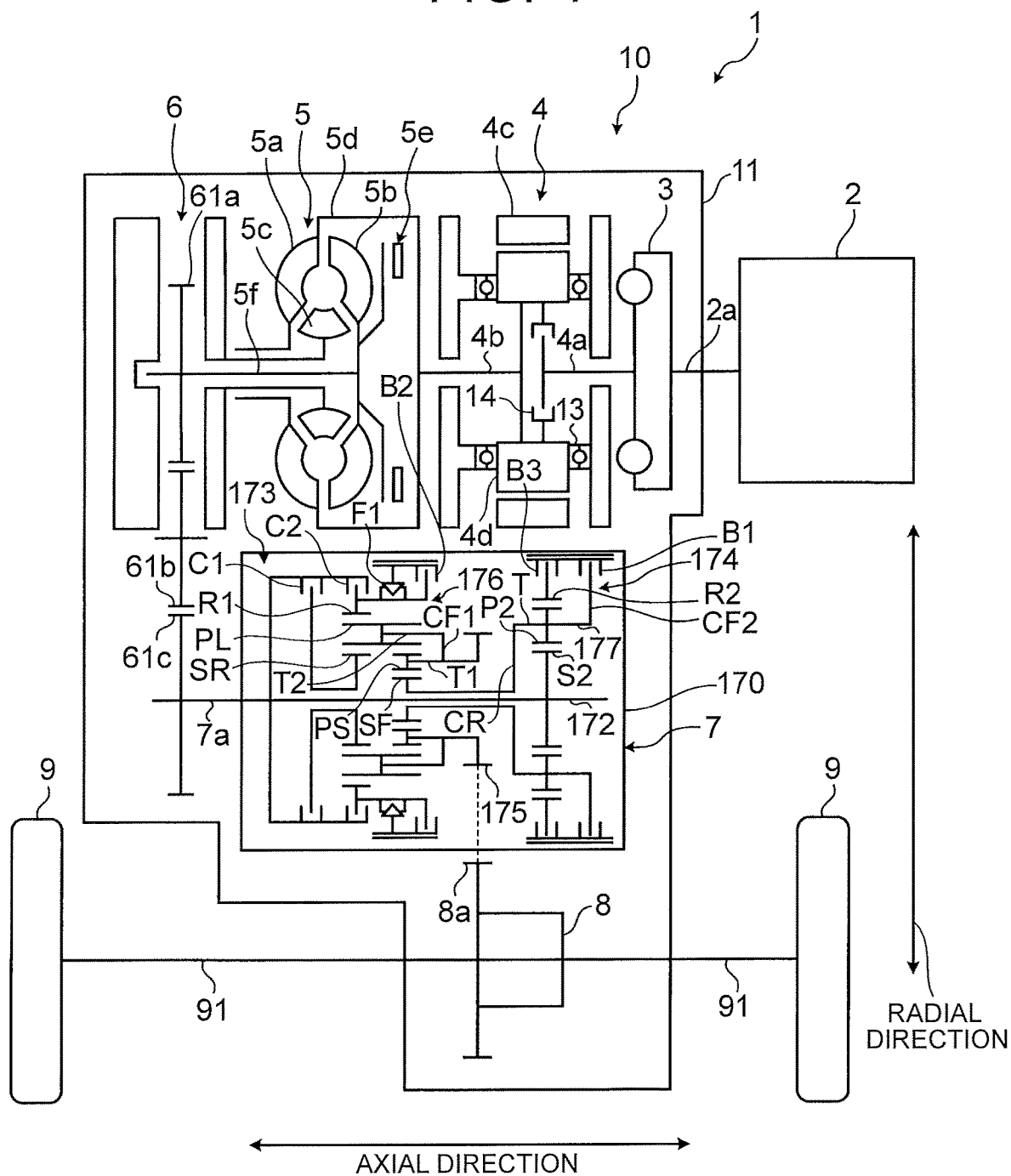
FIG. 4 is a skeleton diagram of a hybrid vehicle at the time of using a transmission mechanism including a planetary gear mechanism.

FIG. 4 is a skeleton diagram of a hybrid vehicle 1 at the time of using a transmission mechanism 7 including a planetary gear mechanism. Note that the hybrid vehicle 1 illustrated in FIG. 4 includes the aforementioned power transmission mechanism 6 constituted by three gears. The transmission mechanism 7 illustrated in FIG. 4 includes an input shaft 7a, a sun gear shaft 172, a primary transmission portion 173, a secondary transmission portion 174, and a counter drive gear 175, which are provided in a transmission mechanism case 170. The input shaft 7a and the sun gear shaft 172 are rotatably supported by the transmission mechanism case 170. The input shaft 7a is connected to the sun gear shaft 172 on the same axis, so that the input shaft 7a and the sun gear shaft 172 rotate synchronously. A power transmitted to the input shaft 7a from the third gear 61c of the power transmission mechanism 6 is changed in speed by either or both of the primary transmission portion 173 and the secondary transmission portion 174, and is output from the counter drive gear 175 connected to a carrier CF1 (described later) of the primary transmission portion 173.

The primary transmission portion 173 includes a planetary gear mechanism 176, a clutch C1, a clutch C2, a brake B2, and a one-way clutch F1. The planetary gear mechanism 176 is placed around the sun gear shaft 172, and includes a sun gear SR connected to the sun gear shaft 172 via the clutch C1, a sun gear SF placed coaxially with the sun gear SR and displaced therefrom along the axial direction, a long pinion gear PL, a short pinion gear PS, a ring gear R1, and a carrier CF1. The sun gear SR, the sun gear SF, the long pinion gear PL, the short pinion gear PS, the ring gear R1, and the carrier CF1 are rotatable. The sun gear SR and the sun gear SF are rotatably supported by the sun gear shaft 172 via bearings.

The long pinion gear PL is placed around the sun gear SF and the sun gear SR. The short pinion gear PS is placed around the sun gear SF. The ring gear R1 is placed around the long pinion gear PL. The ring gear R1 is connected to the sun gear shaft 172 via the clutch C2. The ring gear R1 can be fixed to the transmission mechanism case 170 by the brake B2. The one-way clutch F1 is provided between the transmission mechanism case 170 and the ring gear R1, and is configured to allow the ring gear R1 to rotate only in one direction, but prevent the ring gear R1 from rotating in the other direction.

The carrier CF1 is placed on either side of the short pinion gear PS and the long pinion gear PL. The carrier CF1 supports the short pinion gear PS via a first pinion shaft T1 rotatably supporting the short pinion gear PS. The carrier CF1 supports the long pinion gear PL via a second pinion shaft T2 rotatably supporting the long pinion gear PL. The sun gear SF is connected to a carrier CR of a planetary gear mechanism 177 constituting the secondary transmission portion 174 (described later) with a spline connection portion on the same axis, and rotates synchronously with the carrier CR.

The long pinion gear PL meshes with the sun gear SR and the ring gear R1. The short pinion gear PS meshes with the long pinion gear PL and the sun gear SF. One of the sun gear SR and the ring gear R1 functions as an input element by connection with a corresponding one of the clutch C1 and the clutch C2. The planetary gear mechanism 176 is formed in a power transmittable manner between the sun gear SR or the ring gear R1 as the input element and the carrier CF1 as an output element.

The counter drive gear 175 engages with a differential ring gear 8a, and a power output to the counter drive gear 175 is transmitted to drive shafts 91 connected to driving wheels 9 via a differential 8 connected to the differential ring gear 8a, so as to drive the driving wheels 9.

The secondary transmission portion 174 includes the planetary gear mechanism 177, a brake B1, and a brake B3. The planetary gear mechanism 177 includes a carrier CR rotatably placed around the sun gear shaft 172, a carrier CF2, a sun gear S2 integrally provided in the sun gear shaft 172, a ring gear R2 placed around the sun gear S2, and a pinion gear P2 meshing with the sun gear S2 and the ring gear R2. The carrier CR and the carrier CF2 are placed on either side of the pinion gear P2, and support the pinion gear P2 via a pinion shaft T rotatably supporting the pinion gear P2. The carrier CF2 can be fixed to the transmission mechanism case 170 by the brake B1. The ring gear R2 can be fixed to the transmission mechanism case 170 by the brake B3.

Figure 5:
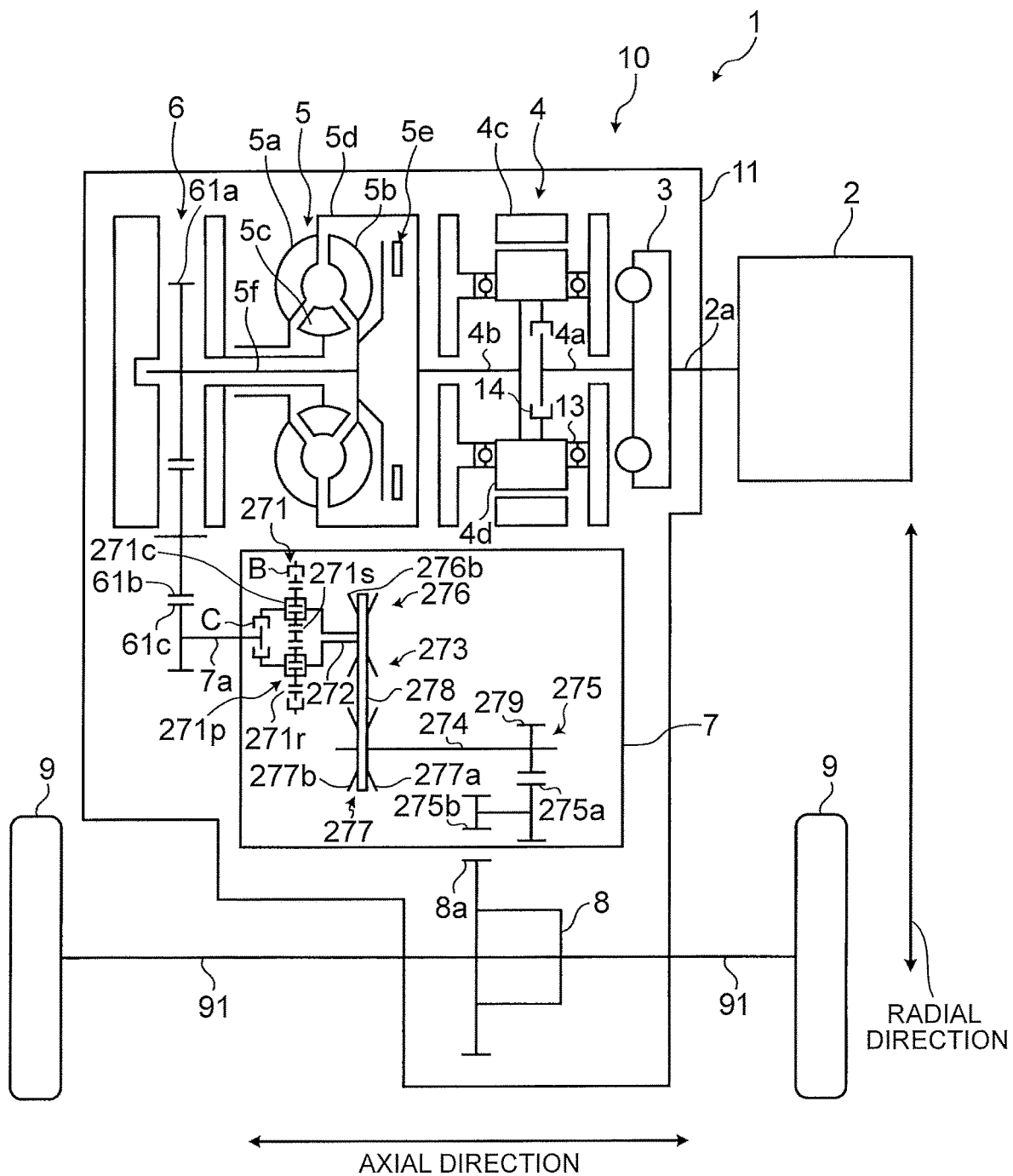
FIG. 5 is a skeleton diagram of a hybrid vehicle at the time of using a transmission mechanism including a continuously variable transmission.

FIG. 5 is a skeleton diagram of a hybrid vehicle 1 at the time of using a transmission mechanism 7 including a continuously variable transmission. Note that the hybrid vehicle 1 illustrated in FIG. 5 includes the aforementioned power transmission mechanism 6 constituted by three gears. The transmission mechanism 7 illustrated in FIG. 5 includes a forward/reverse switching device 271 connected to an input shaft 7*a*, an input shaft 272 connected to the forward/reverse switching device 271, a continuously variable transmission 273 connected to the input shaft 272, an output shaft 274 connected to the continuously variable transmission 273, a reduction gear 275, and the like.

The forward/reverse switching device 271 includes a planetary gear 271*p*, a forward clutch C, and a reverse brake B. A sun gear 271*s* of the planetary gear 271*p* is connected to the input shaft 7*a*, a sun gear 271*c* of the planetary gear 271*p* is connected to the input shaft 272, and a ring gear 271*r* of the planetary gear 271*p* is selectively connected to a housing (not shown) via the reverse brake B. Further, the sun gear 271*c* and the sun gear 271*s* are connected selectively via the forward clutch C. In the forward/reverse switching device 271 configured as such, when the forward clutch C is engaged and the reverse brake B is disengaged, a forward power transmission path is formed. Further, when the reverse brake B is engaged and the forward clutch C is disengaged, a reverse power transmission path is formed. Further, when the forward clutch C and the reverse brake B are both disengaged, the forward/reverse switching device 271 enters a neutral condition (a power transmission interrupted state) where the power transmission is interrupted.

The continuously variable transmission 273 includes a primary pulley 276 provided in the input shaft 272, a secondary pulley 277 provided in the output shaft 274, a transmission belt 278 wound around between the primary pulley 276 and the secondary pulley 277, and the like.

The primary pulley 276 includes a fixed sheave 276*a* fixed to the input shaft 272, and a moving sheave 276*b* provided non-rotatable relative to the input shaft 272 around its axis, but movable in an axial direction of the input shaft 272. Further, the primary pulley 276 includes a hydraulic actuator (not shown) configured to give a thrust in the primary pulley 276 so as to change a V-groove width between the fixed sheave 276*a* and the moving sheave 276*b*. The secondary pulley 277 includes a fixed sheave 277*a* fixed to the output shaft 274, and a moving sheave 277*b* provided non-rotatable relative to the output shaft 274 around its axis, but movable in an axial direction of the output shaft 274. Further, the secondary pulley 277 includes a hydraulic actuator (not shown) configured to give a thrust in the secondary pulley 277 so as to change a V-groove width between the fixed sheave 277*a* and the moving sheave 277*b*. In the continuously variable transmission 273, the V-groove widths of the primary pulley 276 and the secondary pulley 277 are changed so as to change a winding radius of the transmission belt 278, so that a transmission ratio is changed.

An output gear 279 is attached to the output shaft 274 of the continuously variable transmission 273 so as to rotate together in an integrated manner. The output gear 279 meshes with a counter driven gear 275*a* of the reduction gear 275. A counter drive gear 275*b* of the reduction gear 275 meshes with a differential ring gear 8*a* of a differential 8.

Referring back to FIG. 1, the differential ring gear 8*a* meshing with a drive pinion gear (not shown) to which a power from the transmission mechanism 7 is transmitted is connected to the differential 8. Further, the drive shafts 91 are connected to the differential 8, and the driving wheels 9 provided in a pair are attached to opposite axial ends of the drive shafts 91.

The hybrid vehicle 1 of the embodiment has a plurality of running modes such as an engine running mode in which the hybrid vehicle 1 runs only by use of the engine 2 as a drive source, a motor generator running mode in which the hybrid vehicle 1 runs only by use of the motor generator 4 as a drive source, and a hybrid running mode in which the hybrid vehicle 1 runs by use of both the engine 2 and the motor generator 4, and the hybrid vehicle 1 runs by switching the running modes depending on an operating state such as an accelerator operation amount (a requested driving force of a driver) and a vehicle speed. Further, when an accelerator-OFF state in which the accelerator operation amount becomes zero is established during each running mode, coasting (free run) is performed. At the time of coasting, the engine 2 is stopped, thereby making it possible to achieve improvement of fuel efficiency. Further, at the time of coasting, vehicle deceleration, and the like, a rotational force of the driving wheels 9 is transmitted to the motor generator 4 via a power transmission path, so as to generate an electric power by regeneration of the motor generator 4, so that a battery (not shown) is charged with the electric power thus generated.

The clutch 14 is provided in a power transmission path (first power transmission path) between the engine 2 and the motor generator 4, and when the clutch 14 is connected, power transmission is performable between the engine 2 and the motor generator 4, thereby making it possible to rotate the engine 2 and the motor generator 4 in an integrated manner. Meanwhile, when the clutch 14 is disconnected, the power transmission is interrupted between the engine 2 and the motor generator 4, thereby making it possible to rotate the engine 2 and the motor generator 4 independently from each other.

In the hybrid vehicle 1 of the embodiment, a power transmission path (second power transmission path) between the motor generator 4 and the driving wheels 9 is connected in a state where the power transmission is interrupted between the engine 2 and the motor generator 4, and an electric power can be generated by regeneration of the motor generator 4 by a rotational force from a driving-wheel-9 side. On this account, at the time of coasting, the clutch 14 is disconnected, thereby making it possible to restrain a decrease in regeneration efficiency of the motor generator 4 due to a dragging resistance that can be caused in the engine 2 that is stopped during the coasting.

Figure 6:
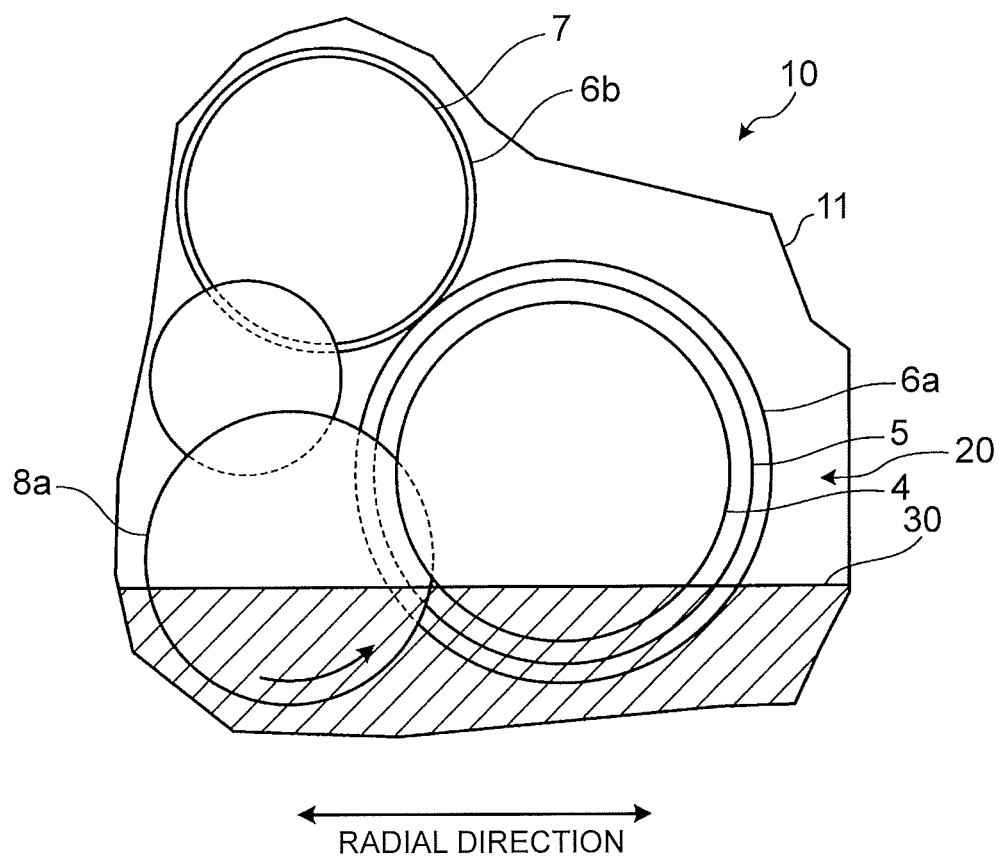
FIG. 6 is a view illustrating a positional relationship of constituents in a transaxle case when a transaxle is viewed from an engine side in an axial direction.

FIG. 6 is a view illustrating a positional relationship of constituents in the transaxle case 11 when the transaxle 10 is viewed from an engine-2 side in the axial direction. In a lower part of a space 20 formed within the transaxle case 11, an oil 30 to be used for lubrication of the transmission mechanism 7, the differential 8, and the like is accumulated, and the motor generator 4 is partially soaked in the oil 30. Hereby, by bringing the motor generator 4 into contact with the oil 30 accumulated in the transaxle case 11, it is possible to cool the motor generator 4.

Further, the differential ring gear 8a is partially soaked in the oil 30 accumulated in the lower part of the space 20 formed in the case 11, and the motor generator 4 and the differential ring gear 8a are placed within the space 20 with such a positional relationship that the oil 30 scooped up by rotating the differential ring gear 8a in a counterclockwise direction in FIG. 6 can make contact with the motor generator 4.

More specifically, in the hybrid vehicle 1 of the embodiment, the motor generator 4 and the differential ring gear 8a are placed such that the differential ring gear 8a is positioned on a torque-converter-5 side relative to the motor generator 4 in the axial direction, so that a part of the motor generator 4 and a part of the differential ring gear 8a overlap with each other when viewed from the axial direction of the output shaft 2a (overlap with each other when viewed from the axial direction), as illustrated in FIG. 6. Further, any shielding such as a wall portion that obstructs the oil 30 scooped up by the differential ring gear 8a from being poured over the motor generator 4 is not provided between the motor generator 4 and the differential ring gear 8a inside the space 20. Hereby, a distance between the motor generator 4 and the differential ring gear 8a is made closer in the radial direction, so that the oil 30 scooped up by the differential ring gear 8a can be easily poured over the motor generator 4, thereby making it possible to improve coolability of the motor generator 4. Further, since the distance between the motor generator 4 and the differential ring gear 8a can be made closer in the radial direction, it is possible to achieve downsizing of the transaxle 10 in the radial direction correspondingly.

As such, in the hybrid vehicle 1 of the embodiment, the motor generator 4 is provided in the transaxle case 11, and the space 20 in which the oil 30 accumulated in the transaxle case 11 can make contact with the motor generator 4 is formed in the transaxle case 11. When the oil 30 and the motor generator 4 make contact with each other in the space 20, the motor generator 4 is cooled. Hereby, it is not necessary to provide an exclusive cooling device for cooling the motor generator 4, thereby making it possible to restrain upsizing of the hybrid vehicle 1 correspondingly. Accordingly, it is possible to achieve downsizing and to cool the motor generator 4.

Note that, even if the shielding is provided between the motor generator 4 and the differential ring gear 8a, such a configuration is presumable that a pipe or the like is provided to pour the oil 30 over the motor generator 4. In this regard, in a case where the shielding is not provided between the motor generator 4 and the differential ring gear 8a like the hybrid vehicle 1 of the embodiment, a constituent such as the pipe can be omitted, thereby making it possible to achieve cost reduction correspondingly.

Further, as described above, by placing the motor generator 4 on the engine-2 side relative to the torque converter 5, it is possible to place the motor generator 4 and the differential ring gear 8a so as to be close to each other in many constituent arrangements that can be employed in the transaxle 10 included in the FF hybrid vehicle 1. Accordingly, the placement of the motor generator 4 on the engine-2 side relative to the torque converter 5 is effective to secure the coolability of the motor generator 4 by scooping of the oil by the differential ring gear 8a.

Figure 7:
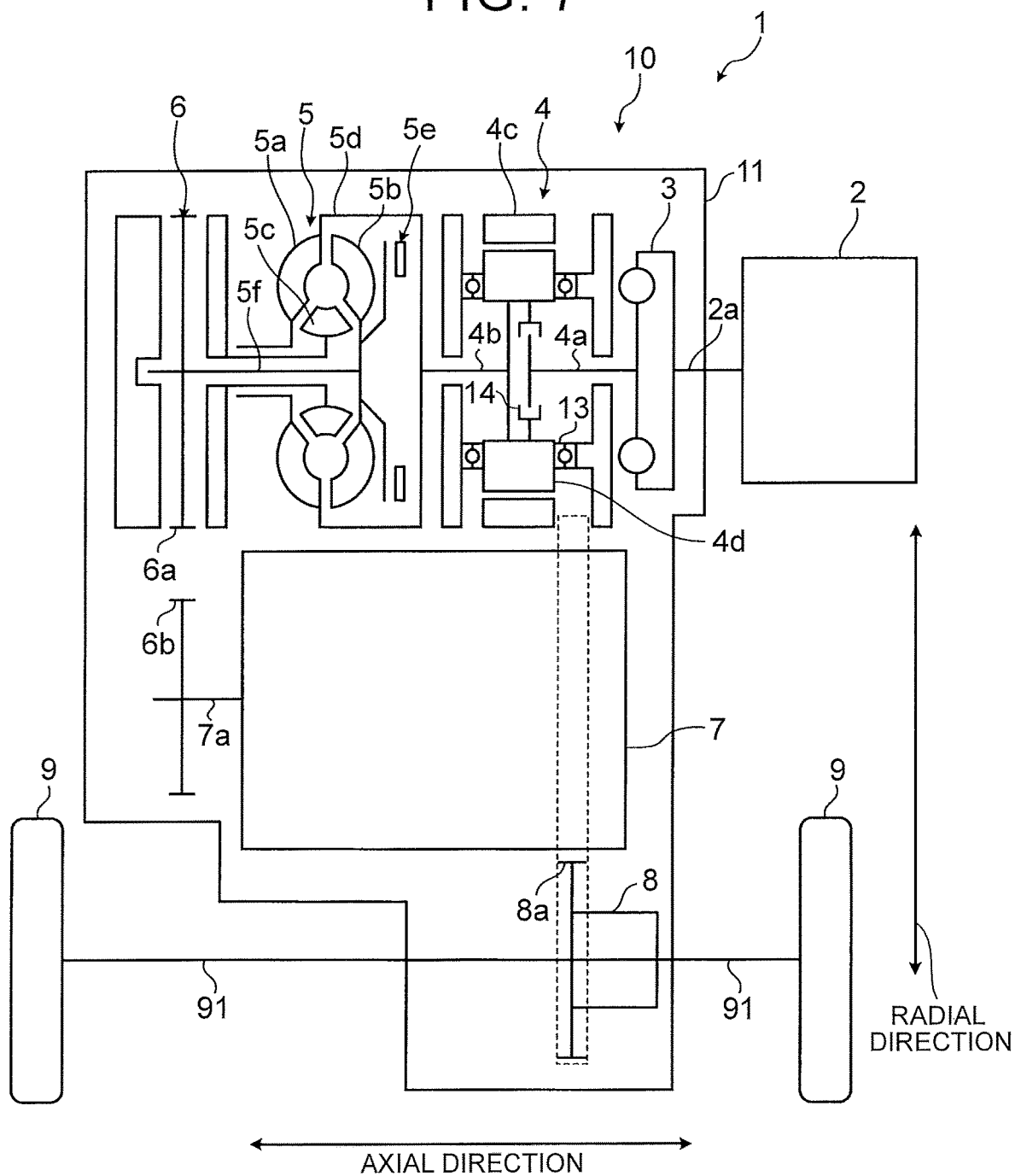
FIG. 7 is a skeleton diagram of a hybrid vehicle in a case where a differential ring gear is positioned on an engine side relative to a motor generator in an axial direction.
Figure 8:
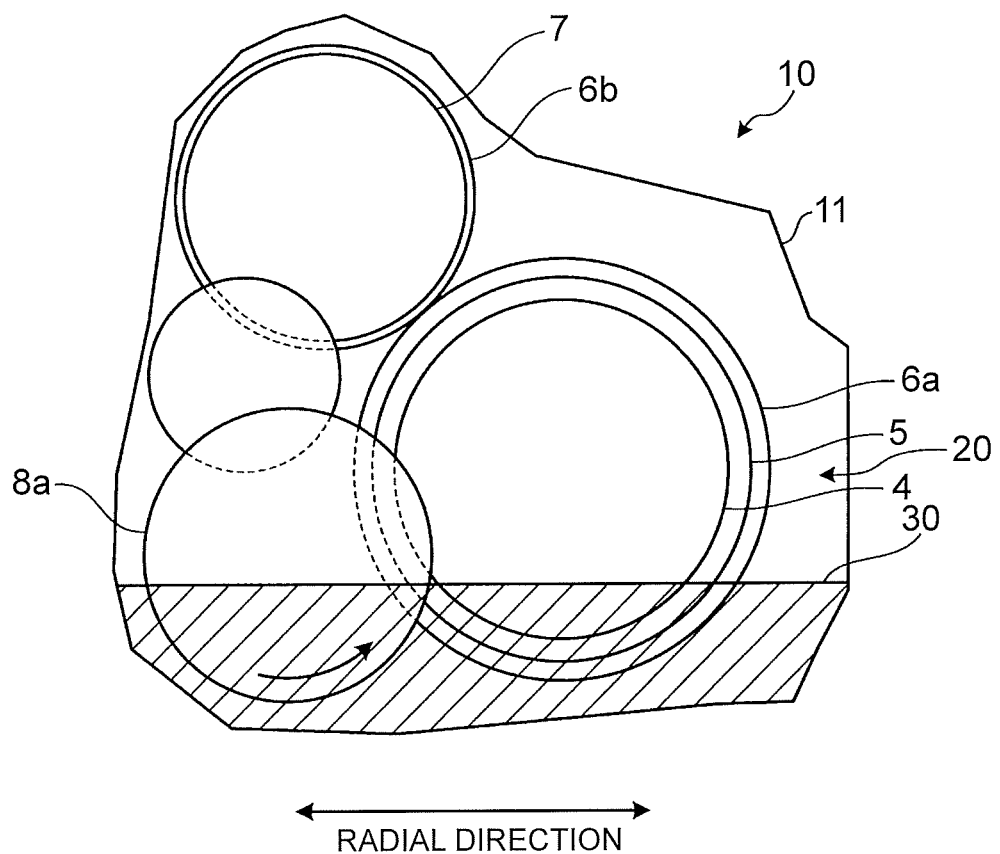
FIG. 8 is a view illustrating a positional relationship of constituents in a transaxle case when a transaxle of the hybrid vehicle illustrated in FIG. 7 is viewed from the engine side in the axial direction.

FIG. 7 is a skeleton diagram of a hybrid vehicle 1 in a case where a differential ring gear 8a is positioned on an engine-2 side relative to a motor generator 4 in the axial direction. FIG. 8 is a view illustrating a positional relationship of constituents in a transaxle case 11 when a transaxle 10 of the hybrid vehicle 1 illustrated in FIG. 7 is viewed from an engine-2 side in the axial direction.

In the hybrid vehicle 1 of the embodiment, as illustrated in FIGS. 7 and 8, the differential ring gear 8a may be positioned on the engine-2 side relative to the motor generator 4 in the axial direction. Even in a case where the motor generator 4 and the differential ring gear 8a are placed as such, the motor generator 4 and the differential ring gear 8a can be placed to be closer to each other, so that an oil 30 scooped up by the differential ring gear 8a can be easily poured over the motor generator 4, thereby making it possible to improve coolability of the motor generator 4. Further, since the distance between the motor generator 4 and the differential ring gear 8a can be made closer in the radial direction, it is possible to achieve downsizing of the transaxle 10 in the radial direction correspondingly.

Figure 9:
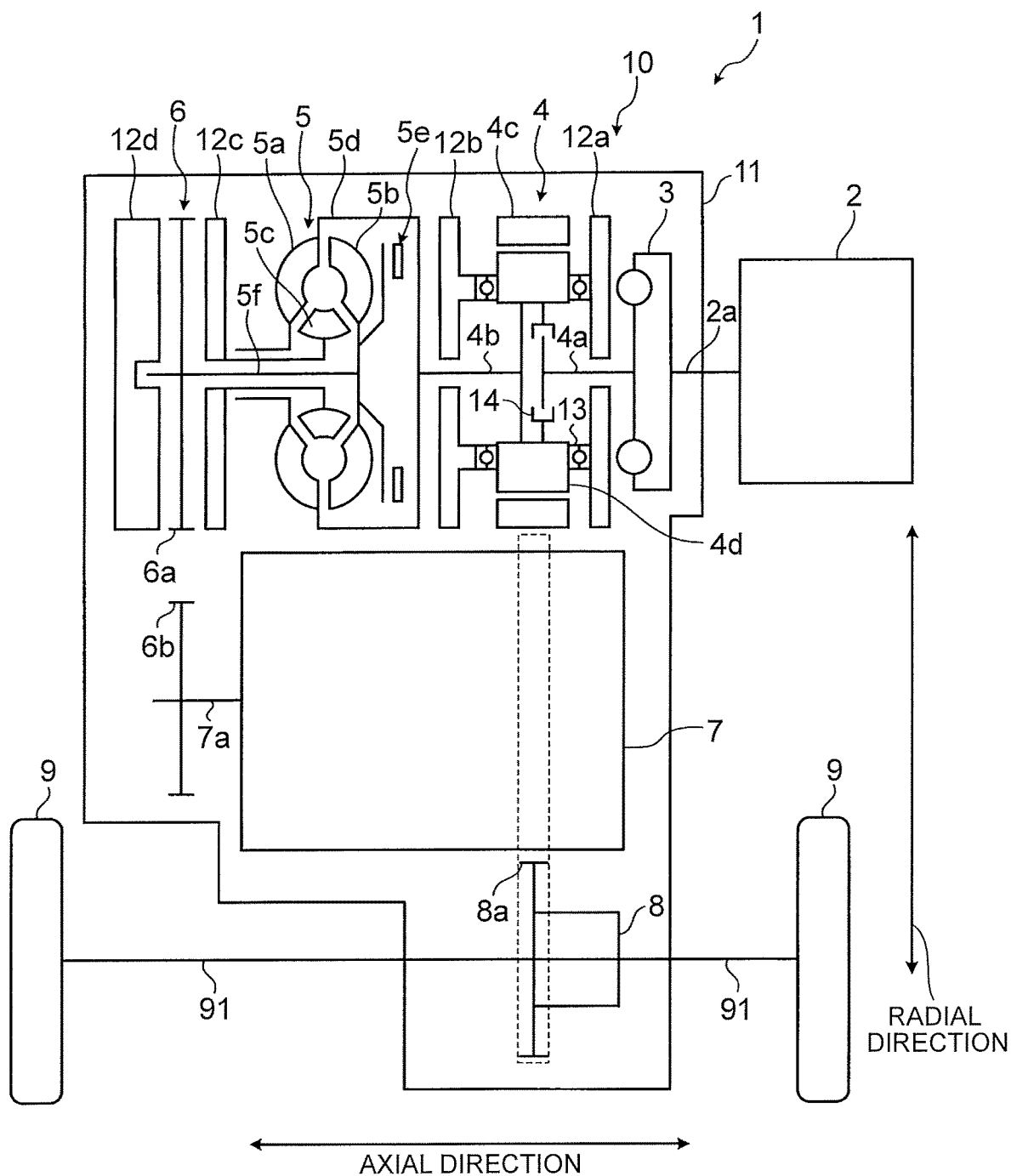
FIG. 9 is a skeleton diagram of a hybrid vehicle in a case where a motor generator and a differential ring gear are placed so that the motor generator is positioned on an extension line of the differential ring gear in a radial direction.
Figure 10:
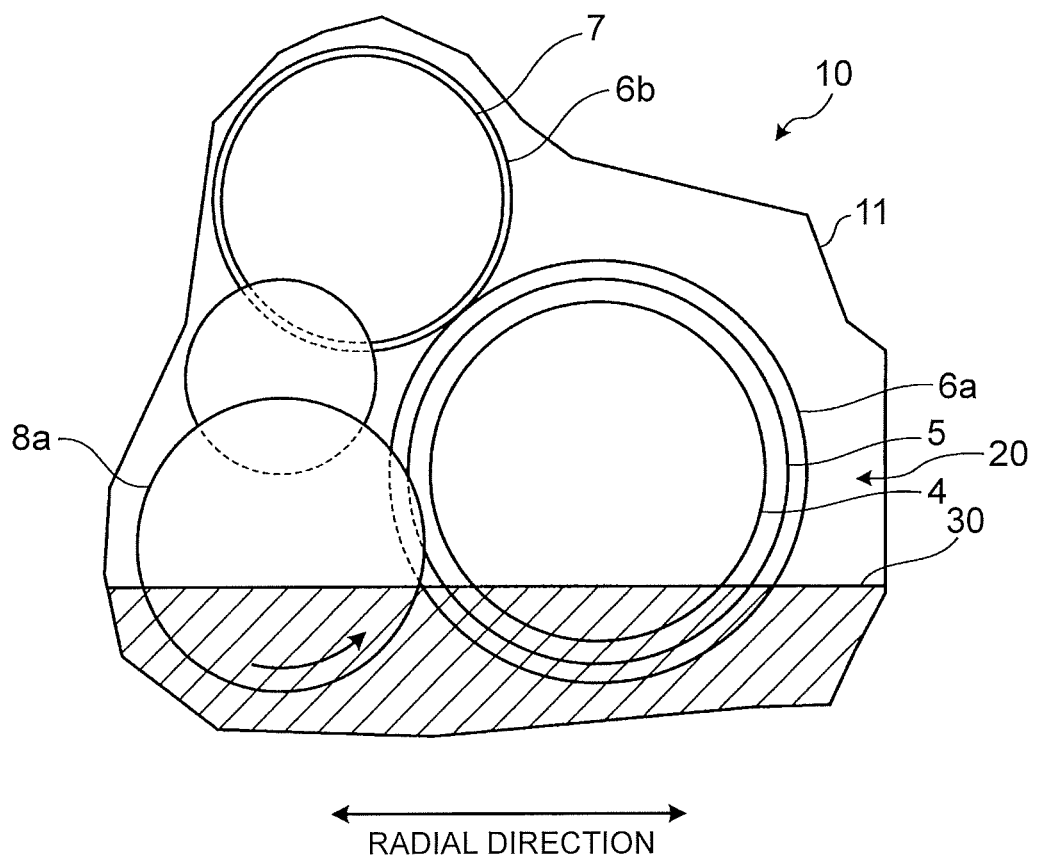
FIG. 10 is a view illustrating a positional relationship of constituents in a transaxle case when a transaxle of the hybrid vehicle illustrated in FIG. 9 is viewed from an engine side in an axial direction.

FIG. 9 is a skeleton diagram of a hybrid vehicle 1 in a case where a motor generator 4 and a differential ring gear 8a are placed so that the motor generator 4 is positioned on an extension line of the differential ring gear 8a in a radial direction. FIG. 10 is a view illustrating a positional relationship of constituents in a transaxle case 11 when a transaxle 10 of the hybrid vehicle 1 illustrated in FIG. 9 is viewed from an engine-2 side in the axial direction.

In the hybrid vehicle 1 of the embodiment, as illustrated in FIGS. 9 and 10, the motor generator 4 and the differential ring gear 8a may be placed so that the motor generator 4 is positioned on an extension line of the differential ring gear 8a in the radial direction. In a case where the motor generator 4 and the differential ring gear 8a are placed as such, an oil 30 scooped up by the differential ring gear 8a can be more easily poured over the motor generator 4, thereby making it possible to improve coolability of the motor generator 4.

What is claimed is:

1. A hybrid vehicle comprising:
   an engine including an output shaft configured to output a power;
   a damper placed on a first axis that is the same axis as the output shaft;
   a rotating machine placed on the first axis;
   a torque converter placed on the first axis;
   a transmission mechanism placed so that an input shaft of the transmission mechanism is positioned on a second axis that is an axis different from the first axis;
   a case in which the rotating machine and the transmission mechanism are accommodated;
   drive shafts driven by the transmission mechanism and provided on a third axis that is an axis different from the first axis and the second axis;
   driving wheels attached to the drive shafts; and
   an oil accumulated in a lower part of a space surrounded by the case and used for lubrication of the transmission mechanism, the oil being in contact with a part of the rotating machine.

2. The hybrid vehicle according to claim 1, wherein:
   the torque converter includes a lock-up clutch; and
   the damper, the rotating machine, and the torque converter are placed in this order from an engine side such that the power of the engine is transmitted to the damper, the rotating machine, and the torque converter in this order.

3. The hybrid vehicle according to claim 1, further comprising a differential connected to the drive shafts, and accommodated in the case, wherein the differential includes a differential ring gear, and
the rotating machine and the differential ring gear are placed in the case such that a part of the rotating machine and a part of the differential ring gear overlap with each other when viewed from an axial direction of the first axis and the differential ring gear partially are in contacted with the oil.

4. The hybrid vehicle according to claim 1, further comprising:
a differential connected to the drive shafts and accommodated in the case, wherein
the differential includes a differential ring gear, and
the rotating machine and the differential ring gear are placed in the case such that the rotating machine is positioned on an extension line of the differential ring gear in a radial direction and the differential ring gear partially contacts with the oil.

5. The hybrid vehicle according to claim 1, further comprising
a clutch configured to interrupt a power transmission between the engine and the rotating machine, the clutch provided in an inside-diameter side of a rotor included in the rotating machine.

6. The hybrid vehicle according to claim 1, further comprising:
a clutch configured to interrupt a power transmission between the engine and the rotating machine, the clutch provided in a first power transmission path between the engine and the rotating machine; and
a second power transmission path between the rotating machine and the driving wheels is connected when the clutch interrupts the first power transmission path.

\* \* \* \* \*